United States Patent [19]
Nijdam

[11] Patent Number: 5,327,789
[45] Date of Patent: Jul. 12, 1994

[54] ELECTROMAGNETIC DETECTION SYSTEM FOR VARIABLE AREA FLOWMETER

[75] Inventor: Paul J. B. Nijdam, Wageningen, Netherlands

[73] Assignee: Rosemount, Inc., Eden Prairie, Minn.

[21] Appl. No.: 862,900

[22] Filed: Apr. 3, 1992

[51] Int. Cl.⁵ ............... G01R 33/025; G01F 1/24
[52] U.S. Cl. .................. 73/861.56; 73/861.58; 324/207.12; 324/207.16; 324/207.17; 324/207.22; 324/207.25
[58] Field of Search ......... 324/207.12, 207.15–207.19, 324/207.24, 253–255, 225, 226, 260–262, 207.22; 73/861.53, 861.56, 861.58, 861.61

[56] References Cited

U.S. PATENT DOCUMENTS

| | | | |
|---|---|---|---|
| 2,537,773 | 1/1951 | MacGeorge | 171/777 |
| 3,024,354 | 3/1962 | Mierendorf et al. | 324/207.12 X |
| 3,128,625 | 4/1964 | Heineman | 73/209 |
| 3,284,786 | 11/1966 | Harris | 340/195 |
| 3,461,382 | 8/1969 | Anderson | 324/253 |
| 3,775,674 | 11/1973 | Van Sloan et al. | 324/253 |
| 3,931,737 | 1/1976 | Conkling et al. | 73/209 |
| 4,297,899 | 11/1981 | Blaney et al. | 73/861.58 |
| 4,366,718 | 1/1983 | Nelson | 73/861.58 |
| 4,523,480 | 6/1985 | Inoue | 73/861.56 |
| 4,611,105 | 9/1986 | Kobold | 73/861.56 X |
| 4,652,820 | 3/1987 | Maresca | 324/207.12 X |
| 4,944,028 | 7/1990 | Iijima et al. | 324/207.12 |
| 5,013,987 | 5/1991 | Wakai | 324/207.12 X |
| 5,124,648 | 6/1992 | Webb et al. | 324/253 |

FOREIGN PATENT DOCUMENTS

1773798 10/1971 Fed. Rep. of Germany.
828030 2/1960 United Kingdom.

*Primary Examiner*—Gerard R. Strecker
*Assistant Examiner*—Warren S. Edmonds
*Attorney, Agent, or Firm*—Westman, Champlin & Kelly

[57] ABSTRACT

A variable area flowmeter employing a vertical tube containing a displaceable magnet and a closed-loop magnetic detection circuit. The closed-loop magnetic detection circuit includes first and second magnetic cores each having a sense coil and a compensation coil. The sense coil provides an output related to magnetic field strength. With a feedback technique, the compensation coil compensates for the magnetic field through the sense coil. Field strength is determined by monitoring feedback. Displacement of the displaceable magnet is determined using information from the first and second magnetic cores. The detection circuit produces an output proportional to the position of the magnet within the tube. This output is translated into fluid flow.

12 Claims, 5 Drawing Sheets

ELECTROMAGNETIC DETECTION SYSTEM FOR VARIABLE AREA FLOWMETER

BACKGROUND OF THE INVENTION

This invention relates to an electromagnetic detection system for use in a variable area fluid flowmeter, More specifically, the invention relates to a device for measuring the rate of fluid flow by detecting the position of a magnetic field created by a magnet displaceable by a fluid flow inside a vertical pipe.

In the prior art, a variable area fluid flowmeter consists of two parts, one part inside the pipe for producing physical displacement of a magnet, and another part outside the pipe for detecting the field produced by the magnet and measuring the magnet's distance from a reference position.

Prior art arrangements usually consist of a vertical pipe fitted with a horizontal orifice plate having a central round orifice. A conic plug is placed inside the pipe, the plug has a vertical pin for vertical guidance of the plug. The pin slides through two rings which are affixed to the pipe and restricts motion of the plug within the pipe to a vertical direction. The plug is free to slide up and down in the pipe. When there is no fluid flow, the conic plug rests in the central orifice. When there is fluid flow, the conic plug slides upwards until the open area between the plug and the orifice is large enough so that the gravitational force on the plug is equal to the force induced by fluid flow. The conic plug contains a bar magnet that produces a magnetic field which extends outside the pipe. The field which extends beyond the pipe is detected by various techniques.

One detection technique involves placing a second bar magnet outside the pipe. The second magnet is placed near the conic plug with its poles opposite to the poles of the magnet in the conic plug. The second bar magnet is pivotably mounted and movement of the conic plug causes the second magnet to rotate. Rotation of the second bar magnet is detected with means such as a variable resistor. The displacement of the bar magnet inside the conic plug is calculated from the rotation of the second bar magnet. This technique is cumbersome and requires added mechanical elements which are less reliable than electrical components.

Another prior art sensing technique involves placing multiple solid state electrically resistive elements in the external magnetic field. The resistance of these elements varies as a function of the magnetic field. By measuring the resistance, the displacement of the conic plug can be calculated. The resistive elements require a significant amount of power, which is added to the power required to perform the calculations to determine the position of the conic plug.

There is accordingly a need in the art for a sensing arrangement which requires no moving parts and which consumes low power.

SUMMARY OF THE INVENTION

The present invention senses position of a displaceable magnet in a variable area fluid flowmeter using external magnetic coils and a feedback technique. The present invention includes a displaceable magnet carried by a conic plug inside the pipe. The arrangement outside the pipe consists of two magnetic cores, one positioned below and the other above a reference position of the displaceable magnet (i.e., the position of the magnet when there is no fluid flow in the pipe). There are two coils wound about each core: a sense coil and a compensation coil. For each core, the sense coil is driven with voltage pulses of alternating polarity which cause a sense current to flow through the sense coil. The current in the sense coil is measured with a current detection circuit which compares the sense current with a reference. At the point at which the current exceeds the reference (i.e., magnetic saturation), the voltage pulse applied to the sense coil is reset to zero. The presence of the external magnetic field shifts the saturation points of the magnetic cores. This causes the positive pulse width to differ from the negative pulse width.

The voltage pulses are used in a feedback loop in which a current is applied to the compensation coil to compensate for the magnetic field in the sense coil from the displaceable magnet. The amount of compensation current is proportional to the displacement of the displaceable magnet. The position of the displaceable magnet is found using outputs from both cores.

The position of the magnet is computed from the ratio of the output voltages produced by the magnetic cores. The voltage output for each core is the product of the field strength of the bar magnet inside the conic plug and a function of the displacement of the bar magnet. The ratio of the two voltage outputs will cause the field strength to cancel, producing a signal that is independent of the field strength of the bar magnet.

DETAILED DESCRIPTION OF THE PREFERRED EMBODIMENTS

Figure 1:
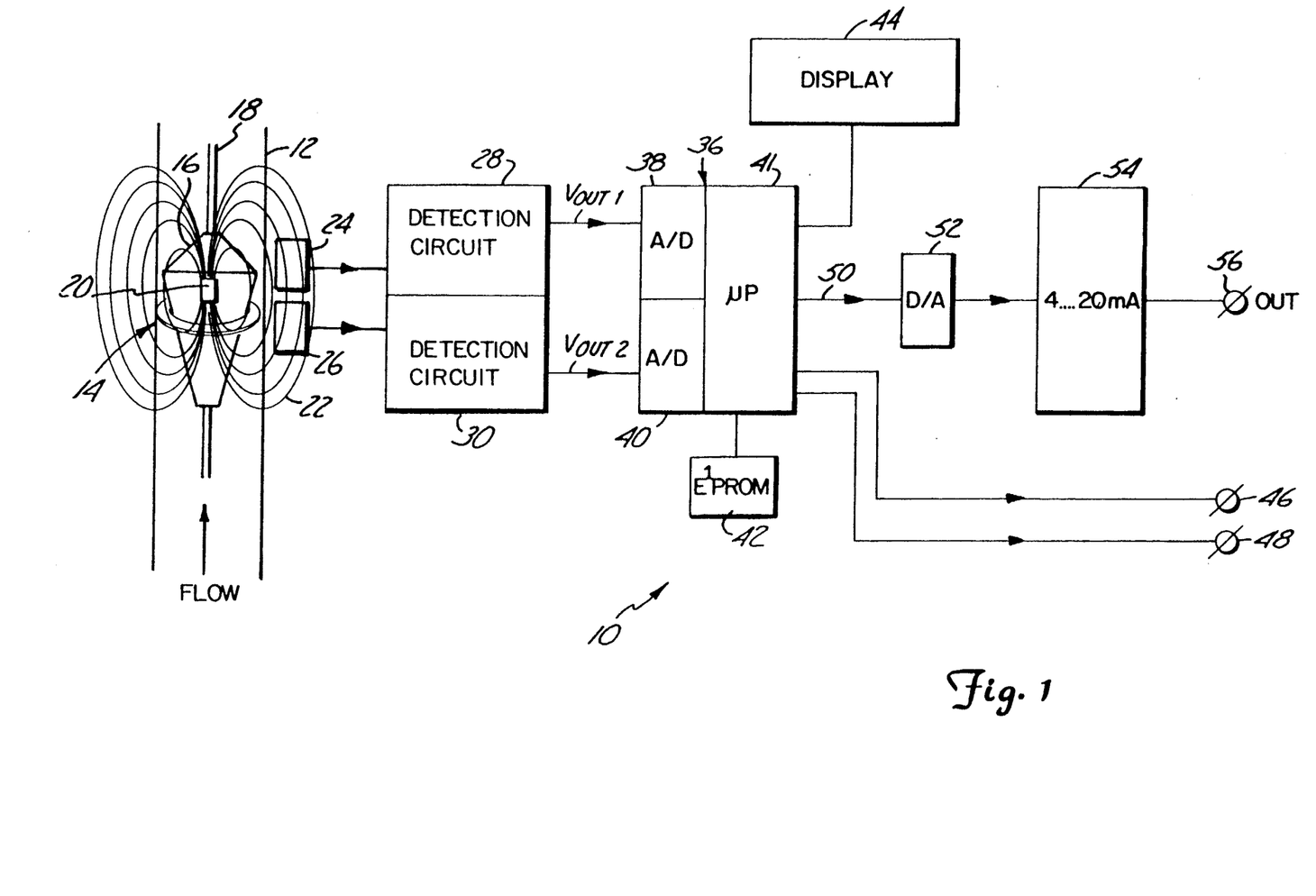
FIG. 1 is a block diagram of a first embodiment of the invention.

FIG. 1 shows a fluid flowmeter 10 according to the present invention. Flowmeter 10 includes a vertical tube 12. Tube 12 is fitted with a central round orifice 14. Tube 12 contains a conic plug 16 and vertical pin 18. Plug 16 contains a bar magnet 20 for producing a magnetic field 22. Field 22 extends outside of tube 12. An upper magnetic core 24 and a lower magnetic core 26, made of high permeability magnetic material, are spaced equidistantly from tube 12. Windings on cores 24 and 26 are connected to detection circuits 28 and 30. Detection circuits 28 and 30 are connected to microprocessor circuit 36. Microprocessor circuit 36 consists of two analog-to-digital converters 38 and 40, and a microprocessor 41. Microprocessor 41 is connected to EPROM 42. Microprocessor circuit 36 is connected to display 44, high flow alarm terminal 46 and low flow alarm terminal 48. Microprocessor circuit 36 is also connected to digital-to-analog converter 52, which is in turn connected to 4-20 mA current loop 54. The output from microprocessor circuit 36 provided to digital-to-analog converter 52 is representative of flow rate. 4-20 mA current loop 54 produces an output on a terminal 56 related to fluid flow.

Figure 2:
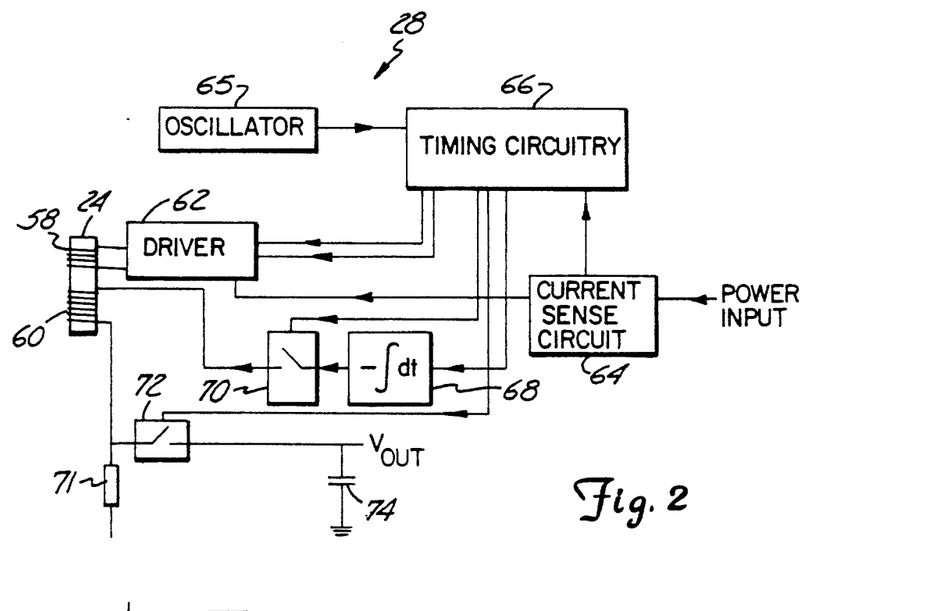
FIG. 2 shows a diagram of one of the magnetic cores, with the associated detection circuitry.

As shown in FIG. 1, fluid flow can be directed through vertical tube 12, with plug 16 free to slide up and down pin 18 in response to fluid flow. When there is no fluid flow in tube 12, plug 16 rests in orifice 14, blocking orifice 14 and providing a reference point for bar magnet 20. When there is fluid flow, plug 16 rises along vertical wire 18 until the force of gravity balances the force induced by the fluid flow. As plug 16 rises and falls in tube 12 in response to fluid flow, magnet 20 contained in plug 16 also rises and falls. The strength of magnetic field 22 emitted by bar magnet 20 therefore with respect to the locations of magnetic cores 24 and 26. The strength of magnetic field 22 at the location of magnetic cores 24 and 26 is detected by detection circuits 28 and 30. Detection circuit 28 is shown in FIG. 2, and its operation is described below. The operation of detection circuit 30 is similar.

Output $V_{OUT1}$ of detection circuit 28 attached to magnetic core 24, and output $V_{OUT2}$ of identical detection circuit 30 attached to magnetic core 26 are fed into microprocessor circuit 36. $V_{OUT1}$ is fed into analog-to-digital converter 38, and $V_{OUT2}$ is fed into analog-to-digital converter 40. Analog-to-digital converter 38 produces a digital representation of output $V_{OUT1}$. Analog-to-digital converter 40 produces a digital representation of output $V_{OUT2}$. The microprocessor of microprocessor circuit 36 processes outputs $V_{OUT1}$ and $V_{OUT2}$ to produce an intermediate computation proportional to the displacement of magnet 20, independent of the strength of the field produced by magnet 20.

Microprocessor circuit 36 is provided with a table containing a few possible positions of magnet 20, with a corresponding fluid flow rate for each position. Microprocessor circuit 36 uses this table to interpolate the position of magnet 20. This table can also be used to interpolate flow rate. Microprocessor circuit 36 produces direct flow rate output 50. Microprocessor circuit 36 also activates high flow alarm terminal 46 and low flow alarm terminal 48 as appropriate, and also drives flow rate display 44. Flow rate output 50 is supplied to digital-to-analog converter 52, which produces analog signal on output 53 which is an analog representation of flow rate output 50. Analog signal 53 is supplied to 4-20 mA current loop 54. Current loop 54 produces an output on terminal 56 which provides flow rate information to other devices.

FIG. 2 is a block diagram illustrating the coils and circuitry associated with magnetic core 24 and detection circuit 28. Coils and circuitry associated with magnetic core 26 and detection circuit 30 are identical.

According to FIG. 2, magnetic core 24 is wound with sense coil 58 and compensation coil 60. Sense coil 58 is connected to driver circuit 62. Driver circuit 62 is in turn connected to current sense circuit 64 and timing circuitry 66. Timing circuitry 66 is driven by oscillator 65. Current sense circuit 64 is connected to timing circuitry 66. Timing circuitry 66 is also connected to integrator 68 and switch 70. Switch 70 is connected to a first side of compensation coil 60. A second side of compensation coil 60 is connected to a load 71, a sample and hold switch 72, and a capacitor 74 which provides a voltage output $V_{OUT1}$. Load 71, switch 72, and capacitor 74 form a sample and hold circuit having output $V_{OUT1}$. The $V_{OUT1}$ output connects to analog-to-digital converter 38 shown in FIG. 1. Detection circuit 30 consists of components and connections similar to those of detection circuit 28.

Figure 4A:
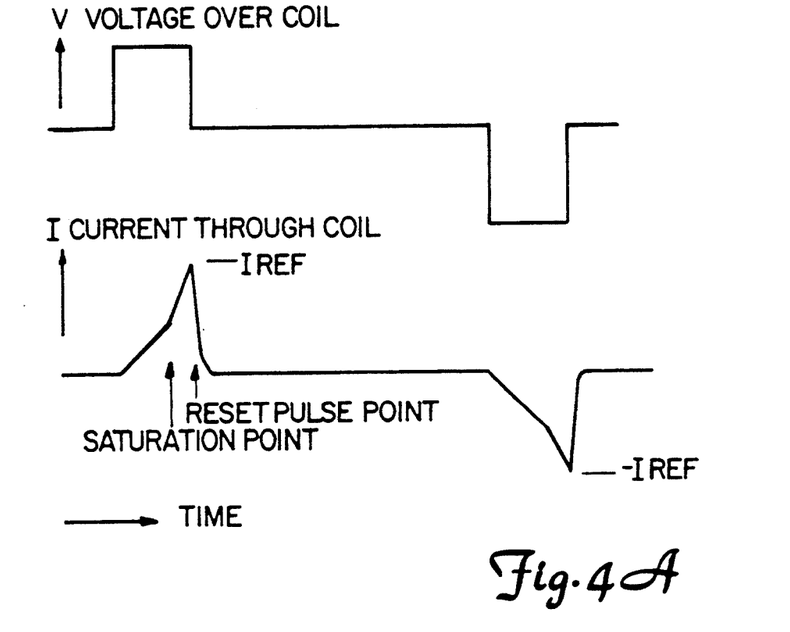
FIG. 4A shows pulsed voltage signals supplied by the driver circuit, and current through the sense coil, in the absence of an external magnetic field.

Detection circuit 28 operates by taking advantage of variations in current through sense coil 58. The saturation of magnetic core 24 causes a rapid increase in current as the saturation point is reached. The relationship between the voltage pulses fed to sense coil 58 by driver 62 and the current through sense coil 58 is shown in FIG. 4A. The presence of magnetic field 22 causes the saturation point of magnetic core 24 to shift in time, causing variations in the point of rapid current increase through sense coil 58. Detection circuit 28 uses these variations to produce output $V_{OUT1}$, which is proportional to the strength of magnetic field 22 at the location of core 24.

Figure 3:
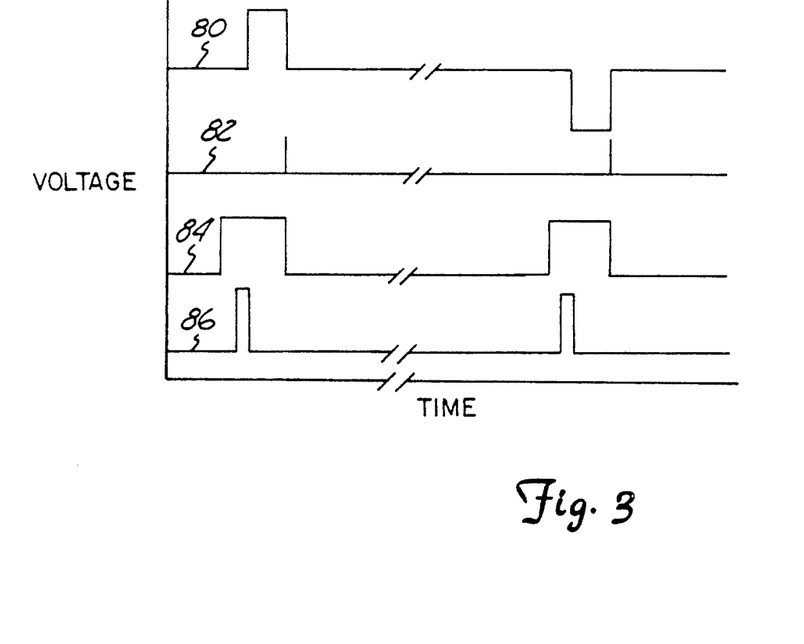
FIG. 3 is a timing diagram showing the relationships between the signals produced by the circuitry illustrated in FIG. 2.

FIG. 3 shows a timing diagram for detection circuit 28 of FIG. 2. Waveform 80 shows the positive and negative voltage pulses applied to sense coil 58 by timing circuit 66 through driver 62. Waveform 82 shows reset pulses applied to timing circuit 66 by current sense circuit 64. The pulses on waveform 82 are generated when current through sense coil 58 reaches a predetermined level. The pulses on waveform 82 cause timing circuit 66 to reset the pulses on waveform 80. Waveform 84 is applied to the control input of switch 70 by timing circuitry 66. Timing circuit 66 applies waveform 86 to sample and hold switch 72.

Sense coil 58 is driven by driver 62 with alternating positive and negative voltage pulses. Timing circuitry 66 controls the timing of the pulses from driver 62 (see waveform 82 in FIG. 3). These pulses induce a current in sense coil 58 which is detected by current sense circuit 64. Circuit 64 compares the current through coil 58 with a reference current. At the point at which the current in sense coil 58 attains the reference current, current sense circuit 64 sends a reset signal to timing circuitry 66. The reset signal causes timing circuitry to reset the voltage pulses in waveform 80 sent to sense coil 58.

The point in time at which magnetic core 24 saturates shifts because of the presence and strength of magnetic field 22. The strength of magnetic field 22 at the location of magnetic core 24 varies as the distance between magnet 20 and magnetic core 24 changes due to the rise and fall of magnet 20 in vertical tube 12. This variation of magnetic field 22 causes variation of the time at which magnetic core 24 saturates. The presence of the magnetic field 22 applied to core 24 causes the core to reach saturation earlier when the current applied to coil 58 produces a field in the core in the same direction as the magnetic field 22. The reference point will be reached earlier by the current flowing in the direction favored by the saturation of core 22 than by current flowing in the other direction. This timing difference will vary as the detected strength of magnetic field 22 varies at the location of magnetic core 24. The current in sense coil 58 therefore changes with the shifting of the saturation point of magnetic core 24. The time at which the current through sense coil 58 exceeds the reference varies, causing the timing of the reset pulse transmitted by current sense circuit 64 to vary.

Figure 4B:
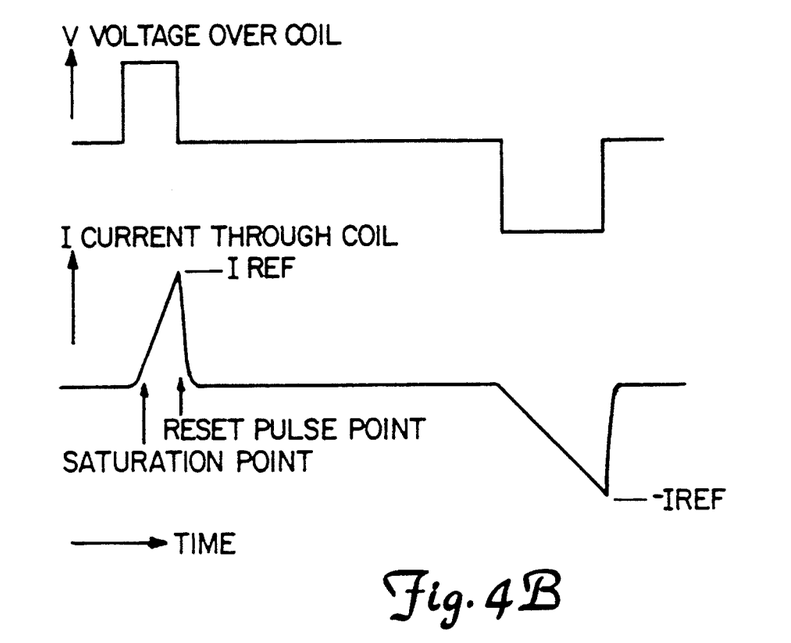
FIG. 4B shows the signals of FIG. 4A with an external magnetic field present.

Because of the shift in the saturation point of magnetic core 24 caused by the presence of magnetic field 22, the width of the positive pulses transmitted to sense coil 58 by driver 62 differs from the width of the negative pulses. As the saturation point of magnetic core varies due to the change in strength of magnetic field at the location of magnetic core 24, the amount by which the positive pulse width differs from the negative pulse width varies. FIGS. 4A and 4B shows a graph of the voltage and current applied to sense coil 58 with application of the reset pulse applied by timing circuitry 66. FIG. 4A shows operation without an external magnetic field and FIG. 4B shows operation with the presence of an external magnetic field.

Figure 5:
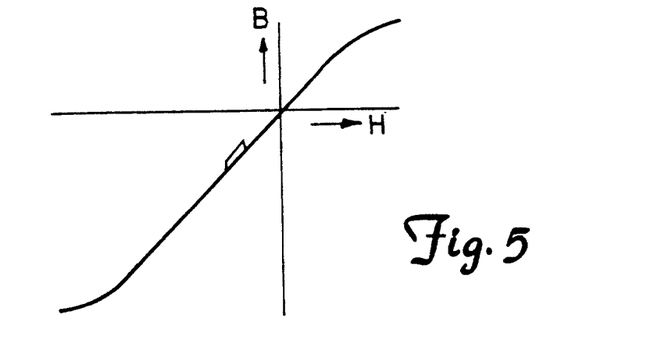
FIG. 5 is a graph of the B-H curve.

FIG. 5 shows a B-H curve associated with magnetic core 24. H is the magnetizing field due to a coil wound on core 24 and B is the magnetic field. The external field (other than the applied magnetizing field) causes the zero point of the curve to be off center so the curve is not symmetric. This shifts the saturation point of core 24 when a magnetizing field H is applied with windings on core 24.

Figure 6:
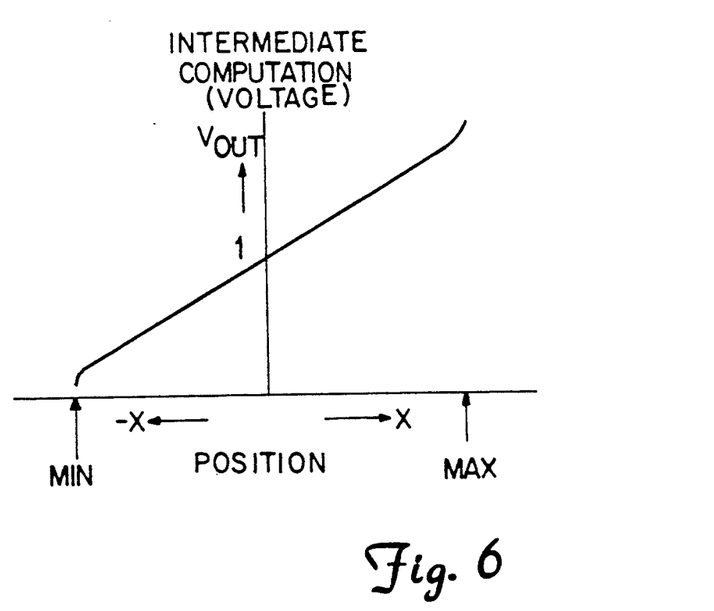
FIG. 6 is a graph of a voltage with respect to the displacement of the bar magnet.

The voltage pulses as modified by timing circuit 66 based upon the reset signal from current sense circuit 64 are transmitted to integrator 68. Integrator 68 with switch 70 produces a pulsed current output. The amplitude of the pulsed current produced by integrator 68 and switch 70 is representative of the compensating current. The amplitude is formed by integrating the difference in the positive and negative pulse widths and will change until these pulse widths are equal. The operation of switch 70 is regulated by timing circuitry 66 which switches the current on the compensation coil 60 just before a sense pulse on the sense coil 58 is applied. In this way, power consumption is reduced. The amplitude of the pulsed current produced by integrator 68 is representative of the difference in the positive and negative pulse widths. The pulsed current produced by integrator 68 is routed through switch 70. The operation of switch 70 is regulated by timing circuitry 66 to make the pulse width of the current produced by integrator 68 uniform. The current as regulated by switch 70 is fed to compensation coil 60. The pulsed current amplitude on compensation coil 60 is sensed by resistor 71 and fed to a sample and hold circuit formed by switch 72 and capacitor 74. The sampling rate is controlled by circuitry 66. Sample and hold switch 72 produces an output voltage $V_{OUT1}$ which is directly proportional to the strength of magnetic field 22 produced by magnet 20. This output voltage is held by capacitor 74. The outputs $V_{OUT1}$ and $V_{OUT2}$ are provided to microprocessor 42 through analog-to-digital converters 38 and 40, respectively. Microprocessor circuit 36 produces an intermediate computation representative of position of magnet 20. FIG. 6 is a graph of the intermediate computation of microprocessor circuit 36 against the displacement of magnet 20. As can be seen from FIG. 6, the graph is strict monotone within the range of possible positions of magnet 20.

Figure 7:
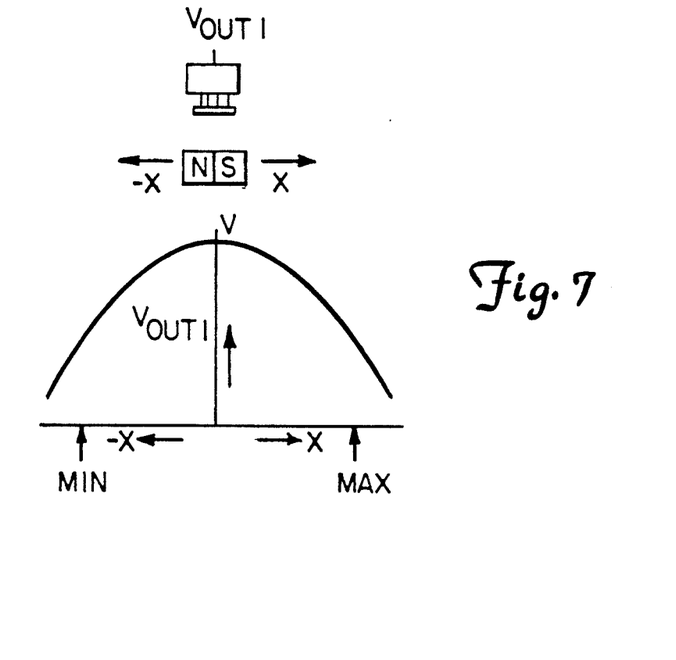
FIG. 7 is a graph of the field strength of an external magnet at the position of a magnetic core, with respect to the position of the external magnet.

Output voltage $V_{OUT1}$ produced by detection circuit 28 is a function of the displacement of magnet 20 from magnetic core 24. FIG. 7 shows the relationship between $V_{OUT1}$ and the displacement of magnet 20 from magnetic core 24. As illustrated in FIG. 1, there are two magnetic cores 24 and 26 connected to two detection circuits 28 and 30 within magnetic field 22 produced by magnet 20. These two circuits produce two voltage outputs $V_{OUT1}$ and $V_{OUT2}$, each of which is a function of the displacement of magnet 20. The relationship of the two voltage outputs $V_{OUT}$ to the displacement of magnet 20 is illustrated in FIG. 8.

Figure 8:
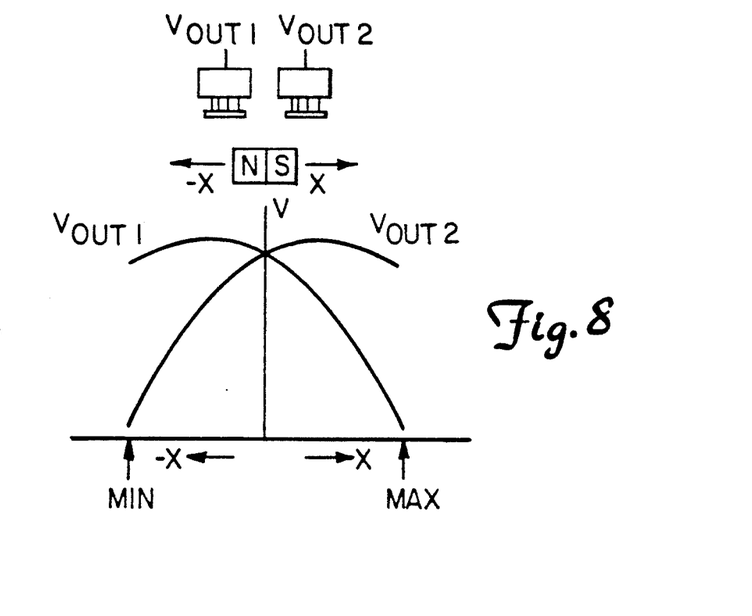
FIG. 8 is a graph of the field strength of an external magnet at the position of each of two magnetic cores, with respect to the position of the external magnet.

Turning to FIG. 8, it will be clear how microprocessor 41 of microprocessor circuit 36 processes outputs $V_{OUT1}$ and $V_{OUT2}$ to produce a representation of the displacement of magnet 40. As seen in FIG. 8, $V_{OUT1}$ and $V_{OUT2}$ are functions of x, where x is the displacement of magnet 20. Specifically:

VOUT1 (x)=M*f(x+Δx) and
VOUT2(x)=M*f(x−Δx)

where Δx is the distance the cores are shifted from the center reference point orifice 14 and M is the field strength of magnet 20. The position of magnet 20 is calculated by using the following algorithm:

Equation 2:
VOUT1 ≧ VOUT2: $V =$ $$\frac{VOUT2}{VOUT1} = \frac{Mxf(x - \Delta x)}{Mxf(x + \Delta x)} = \frac{f(x - \Delta x)}{f(x + \Delta x)}$$

And

Equation 3:
VOUT1 < VOUT2: $V =$ $$2 - \frac{VOUT2}{VOUT1} = 2 - \frac{Mxf(x + \Delta x)}{Mxf(x - \Delta x)} = 2 - \frac{f(x + \Delta x)}{f(x - \Delta x)}$$

It will be seen from the above equations that for a calculation performed on outputs $V_{OUT1}$ and $V_{OUT2}$, the field strength M of magnet 20 is eliminated as a factor, so that intermediate computation of microprocessor circuit 36 is a function solely of the displacement of magnet 20.

Although the present invention has been described with reference to preferred embodiments, workers skilled in the art will recognize that changes may be made in form and detail without departing from the spirit and scope of the invention. For example, the invention can be used to detect displacement in differential pressure membranes containing a small magnet.

What is claimed is:

1. A flowmeter for measuring flow of a fluid through a flow passage, comprising:
    a displaceable magnet mounted within the flow passage responsive to fluid flow through the flow passage;
    sense means proximate the displaceable magnet for detecting a magnetic field emitted by the displaceable magnet and providing a field strength output related to field strength of the magnetic field;
    compensation means responsive to an input signal for producing a compensating magnetic field proximate the sense means;
    means for applying the input signal to the compensation means based upon the field strength output, whereby a feedback loop is created through the sense means and the compensation means carrying a feedback signal related to displacement of the displaceable magnet; and
    output means for producing an output related to fluid flow based upon the feedback signal.

2. The flowmeter of claim 1 including means for communicating the output related to fluid flow over a two wire current loop.

3. The flowmeter of claim 1 and further including:

second sense means proximate the displaceable magnet for detecting the magnetic field emitted by the displaceable magnet and providing a second field strength output related to field strength of the magnetic field at the second sense means; and means for canceling effects of field strength variations of the displaceable magnet based upon the feedback signal and the second field strength output.

4. A flowmeter for measuring flow of a fluid through a flow passage, comprising:

a displaceable magnet mounted within the flow passage responsive to fluid flow through the flow passage;

first detection means for providing a first electrical output signal related to displacement of the displaceable magnet;

second detection means for providing a second electrical output signal related to displacement of the displaceable magnet; and means coupled to the first and second detection means for canceling effects of field strength variations and for providing an output related to fluid flow based upon displacement of the displacement magnet based upon the first output from the first detection circuit and the second electrical output signal from the second detection circuit.

5. The flowmeter of claim 4 including means for converting the output related to displacement of the displaceable magnet to a signal representative of fluid flow.

6. The flowmeter of claim 4 wherein the first detection means and the second detection means comprise:

sense means proximate the displaceable magnet for detecting a magnetic field emitted by the displaceable magnet and providing a field strength output related to field strength of the magnetic field from the displaceable magnet;

compensation means responsive to a feedback signal for producing a compensating magnetic field proximate the sense means;

means for applying the feedback signal to the compensation means based upon the field strength output, whereby a feedback loop is created through the sense means and the compensation means, and the feedback signal is related to displacement of the displaceable magnet; and output means for producing an electrical output signal related to displacement of the displaceable magnet based upon the feedback signal through the feedback loop.

7. The flowmeter of claim 6 wherein the sense means includes:

a magnetic core;

a sense coil wound on the magnetic core;

means for applying positive and negative voltage pulses to the sense coil;

means for sensing current through the sense coil;

means for resetting the means for applying positive and negative voltage pulses when current flowing through the sense coil attains a predetermined level; and wherein the field strength output is related to widths of the positive and negative voltage pulses.

8. The flowmeter of claim 7 wherein the means for applying includes:

means for applying a current to a compensation coil in the compensation means related to widths of the positive and negative voltage pulses.

9. The flowmeter of claim 8 wherein the compensation coil is wound on the same magnetic core as the sense coil.

10. The flowmeter of claim 9 wherein the means for applying a current to the compensation coil includes an integrator for integrating a difference between positive and negative voltage pulses applied to the same coil.

11. The flowmeter of claim 6 wherein the sense means includes:

a magnetic core;

a sense coil wound on the magnetic core;

means for applying positive and negative voltage pulses to the sense coil;

means for sensing current through the sense coil;

means for resetting the means for applying positive and negative voltage pulses when current flowing through the sense coil attains a predetermined level; and wherein the field strength output is related to widths of the positive and negative voltage pulses.

12. The flowmeter of claim 4 including means for communicating the electrical output signal related to fluid flow over a two wire current loop.

* * * * *

UNITED STATES PATENT AND TRADEMARK OFFICE
CERTIFICATE OF CORRECTION

PATENT NO. : 5,327,789
DATED : July 12, 1994
INVENTOR(S) : Paul J. B. Nijdam

It is certified that error appears in the above-indentified patent and that said Letters Patent is hereby corrected as shown below:

On the title page:

Item: [73] Assignee:

After "Rosemount" please delete ",";

Col. 1, line 7, at the end of the line please delete "," and insert --.--;

Col. 7, line 26, second occurrence of "displacement" should be --displaceable--; and Col. 8, line 31, delete "same" and insert --sense--.

Signed and Sealed this

Twenty-eighth Day of November 1995

Attest:

BRUCE LEHMAN

Attesting Officer

Commissioner of Patents and Trademarks